United States Patent
Tamura

(10) Patent No.: US 10,963,554 B2
(45) Date of Patent: Mar. 30, 2021

(54) ACCESS CONTROL SYSTEM, CONTROL METHOD OF ACCESS CONTROL SYSTEM, AND STORAGE MEDIUM

(71) Applicant: CANON KABUSHIKI KAISHA, Tokyo (JP)

(72) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/196,971

(22) Filed: Nov. 20, 2018

(65) Prior Publication Data

US 2019/0156008 A1    May 23, 2019

(30) Foreign Application Priority Data

Nov. 22, 2017  (JP) .............................. JP2017-225129

(51) Int. Cl.
| | |
|---|---|
| *G06F 21/33* | (2013.01) |
| *H04L 29/06* | (2006.01) |
| *H04L 9/32* | (2006.01) |
| *G06F 21/62* | (2013.01) |
| *H04L 29/08* | (2006.01) |

(52) U.S. Cl.
CPC ........ *G06F 21/335* (2013.01); *G06F 21/6218* (2013.01); *H04L 9/3213* (2013.01); *H04L 9/3247* (2013.01); *H04L 63/0807* (2013.01); *H04L 63/0815* (2013.01); *H04L 63/0892* (2013.01); *H04L 63/102* (2013.01); *H04L 63/107* (2013.01); *G06F 2221/2111* (2013.01); *G06F 2221/2141* (2013.01); *H04L 67/02* (2013.01); *H04L 67/2814* (2013.01)

(58) Field of Classification Search
CPC .............. G06F 21/335; G06F 21/6218; G06F 2221/2111; G06F 2221/2141; H04L 63/0892; H04L 9/3213; H04L 63/0815; H04L 63/0807; H04L 63/102; H04L 9/3247; H04L 63/107; H04L 67/02; H04L 67/2814

See application file for complete search history.

(56) References Cited

U.S. PATENT DOCUMENTS

| | | | | |
|---|---|---|---|---|
| 9,514,324 | B1* | 12/2016 | Potlapally | ............... H04L 63/10 |
| 2002/0023123 | A1* | 2/2002 | Madison | ................. H04L 67/18 |
| | | | | 709/203 |
| 2015/0350179 | A1* | 12/2015 | Kobayashi | ............ H04L 9/3273 |
| | | | | 726/4 |
| 2017/0223138 | A1* | 8/2017 | Amiri | .................... H04L 67/327 |
| 2018/0212975 | A1* | 7/2018 | Bandi | ..................... G06F 16/29 |

FOREIGN PATENT DOCUMENTS

JP          2015-5202 A      1/2015

* cited by examiner

*Primary Examiner* — Matthew Smithers
(74) *Attorney, Agent, or Firm* — Canon U.S.A., Inc., IP Division

(57) ABSTRACT

An access control system is provided and includes a confirmation unit configured to confirm whether a region of a resource server is included in a signed access token by comparing a region included in the signed access token and the region of the resource server, and executes processing with respect to a resource request in a case where a determination unit determines that the signed access token is valid and the confirmation unit confirms that the region of the resource server is included in the signed access token.

9 Claims, 14 Drawing Sheets

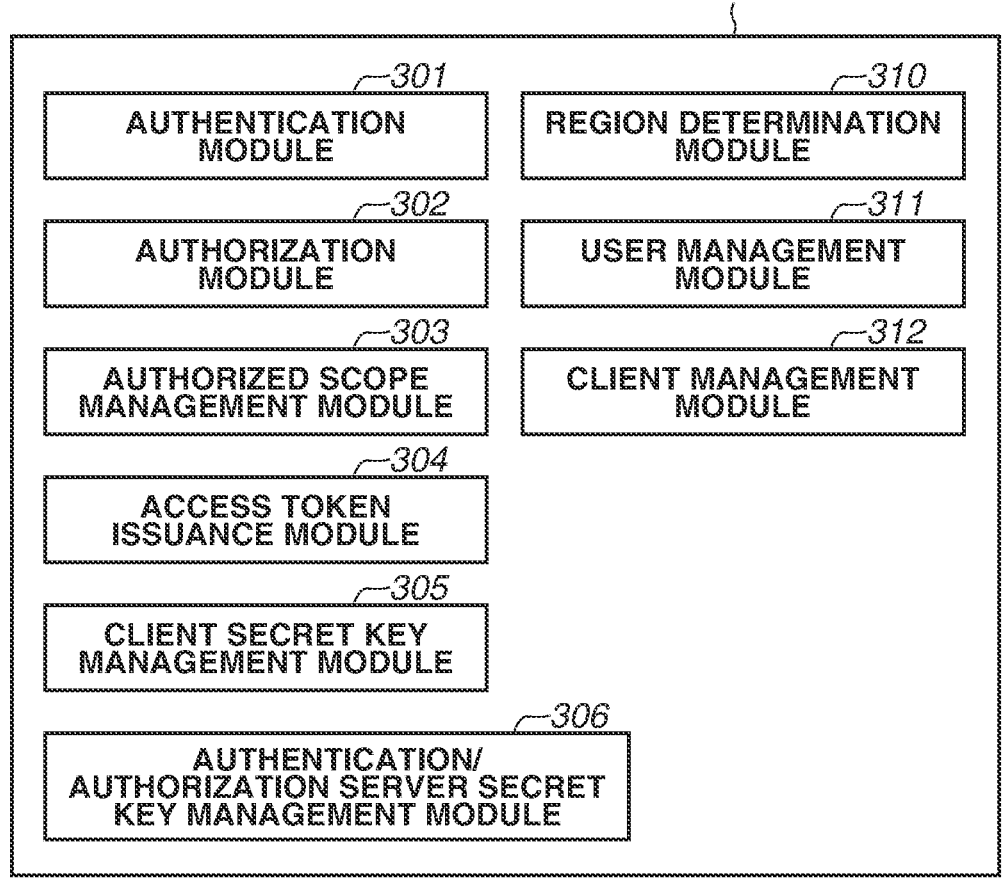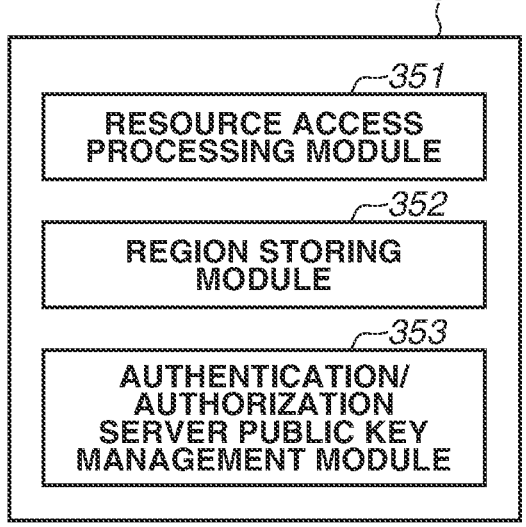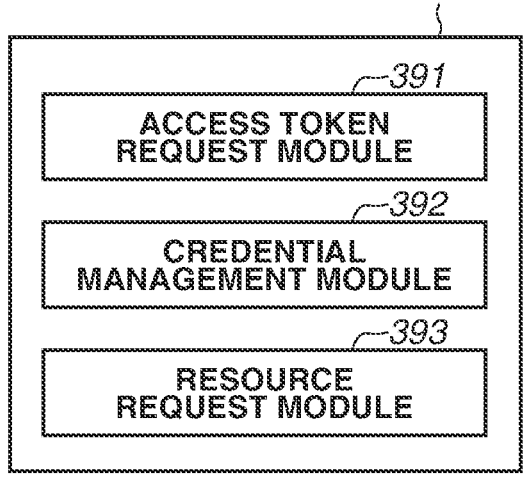

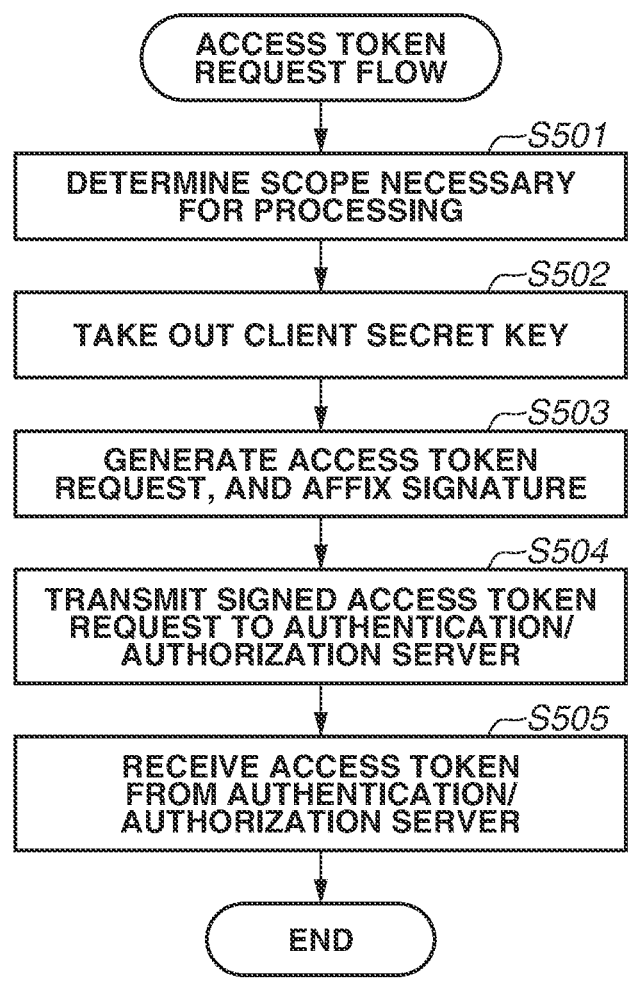

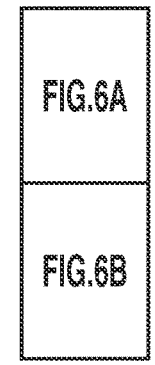
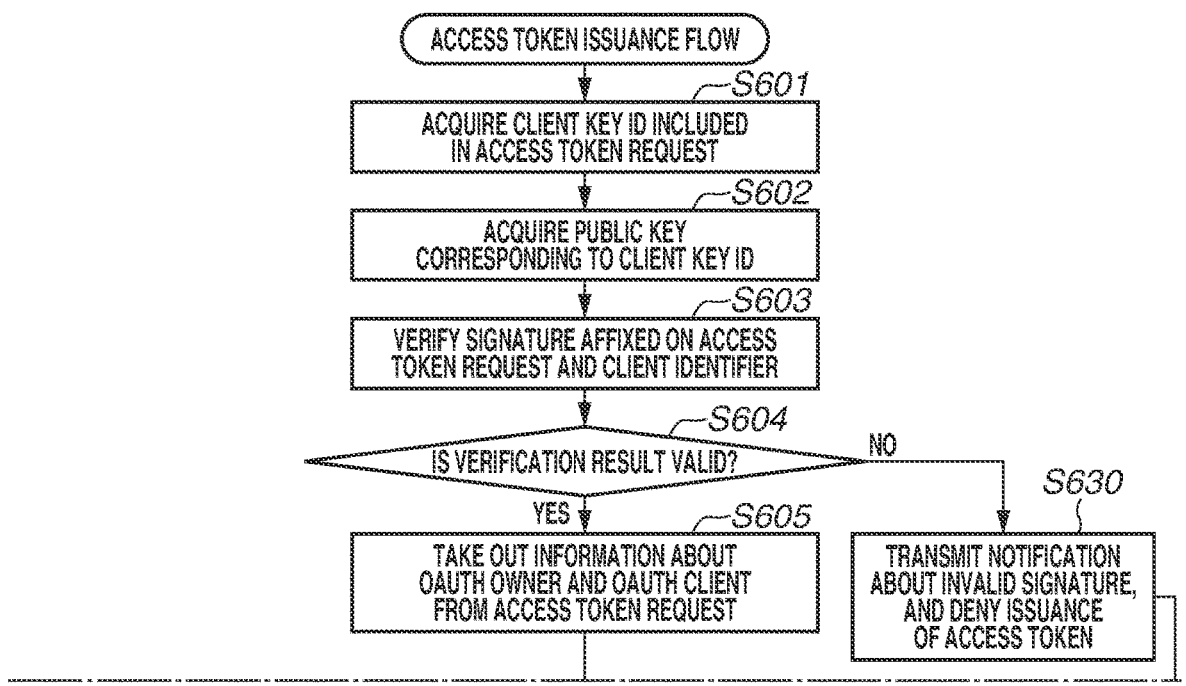

LOG-IN TO SERVER

USER ID: User001

PASSWORD: ********

[LOG-IN]

AUTHORIZATION CONFIRMATION

DELEGATION OF YOUR AUTHORITY IS REQUESTED. PLEASE CHECK CONTENT AND PERMIT OR DENY REQUEST.
  [SCOPE IN WHICH AUTHORITY IS TO BE DELEGATED]
  ScopeA
  ScopeB

[PERMIT] [DENY]

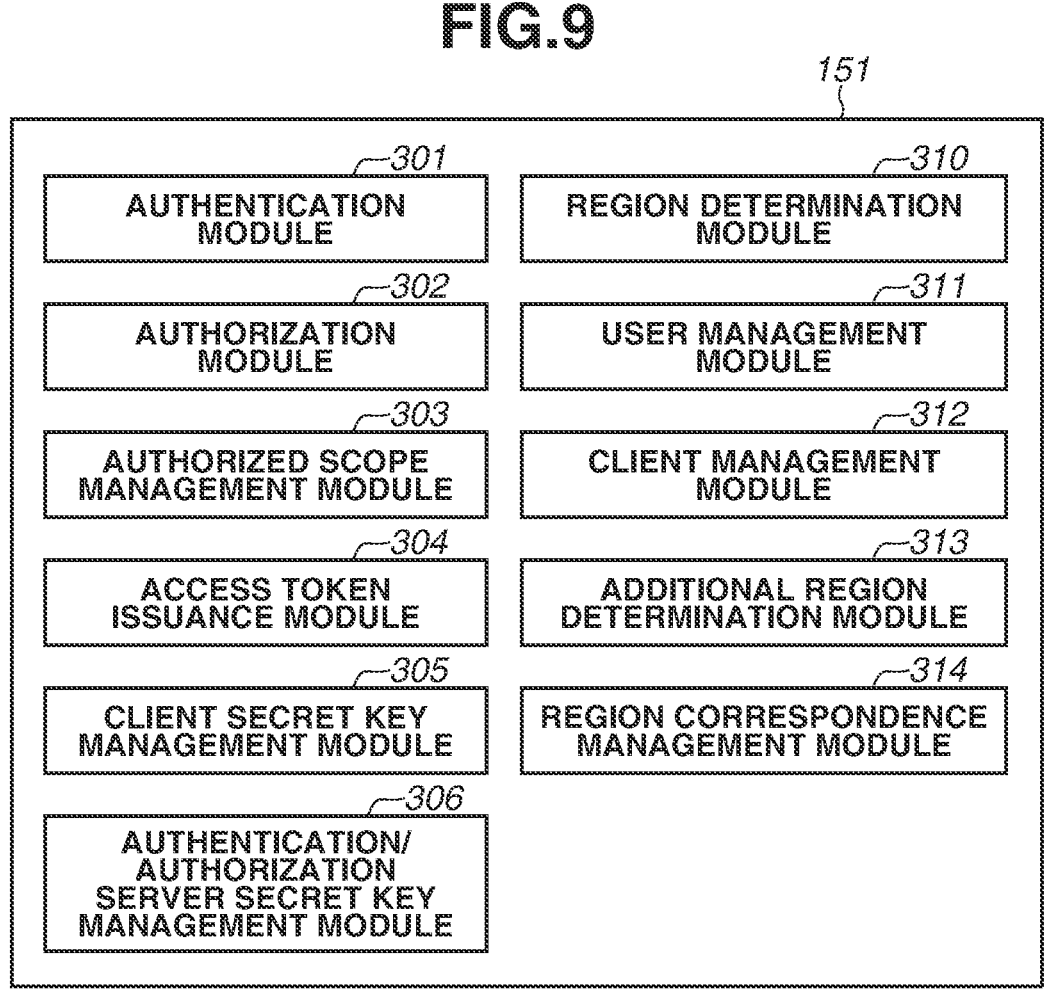

ACCESS CONTROL SYSTEM, CONTROL METHOD OF ACCESS CONTROL SYSTEM, AND STORAGE MEDIUM

BACKGROUND

Field

The present disclosure relates to an access control system which controls an access to a resource server through authentication/authorization processing, a control method of the access control system, and a storage medium.

Description of the Related Art

With the increasing popularization of the cloud service, the chance of cooperating between a plurality of services is increasing. The "services" refer to web applications or functions provided by the servers connected to each other via a network such as the internet. Through the cooperation of the services, a service provider can provide a new service by adding value to a normal service. Meanwhile, the cooperation between services may cause various issues.

In other words, there is an issue in which more information than desired by the user may be exchanged between the services, and thereby leakage of information such as user data and personal information may occur. For example, although a plurality of services may exist in the internet, and cooperation between services may be realized among various services, user data or personal information should not be obtained by services other than the service recognized by the user. Further, it is preferable that a system for cooperating between services be implemented easily from a standpoint of a service provider. In the above-described situation, a standard protocol called "OAuth" which realizes cooperation for authorizations has been developed.

According to the OAuth, for example, when an application included in a terminal accesses data managed by a cloud service, the application needs to acquire an explicit authorization from a user who is the owner of the data. When the user authorizes the access, the application receives a token (hereinafter, called as "access token") which certifies authority to access, so that the application can realize subsequent access by using the access token. Hereinafter, an operation for issuing the access token is called as "authorization operation".

Further, the owner of resources such as data is called as an "OAuth owner", and a user who receives authorization to use the resources from the OAuth owner is called as "OAuth client". In the service cooperation, an external service or an external application which uses a resource managed by a service operates as the above-described OAuth client. In addition, the OAuth owner as the owner of the resource may be the user, the external service, or the external application itself. In the latter case, the OAuth owner and the OAuth client are identical to each other.

Recently, a system which uses, as an access token, a token called "JavaScript Object Notation (JSON) web token (hereinafter, referred to as "JWT")" capable of including attribute information in addition to a token identifier (ID) has been taken into consideration.

An authorization server affixes a signature to the access token by using a secret key of the authorization server. The resource server receives the access token and verifies the signature with a public key of the authorization server to verify whether the received access token is valid.

Since the access token can be verified by each of the resource servers in the system, a load of access token verification processing which has been conventionally concentrated on the authorization server is dispersed, so that the bottleneck in the processing load can be removed. Therefore, improvement in performance of the entire system can be expected. Japanese Patent Application Laid-Open No. 2015-5202 discusses a technique for issuing an access token by using the OAuth.

SUMMARY

According to an aspect of the present disclosure, an access control system includes at least a terminal having a client, a resource server having a resource, and an authorization server, wherein the authorization server includes an issuance unit configured to issue a signed access token for executing verification of an access token by the resource server, and wherein the resource server includes, a determination unit configured to determine whether the signed access token is valid by executing signature verification on the signed access token in a case where the resource server receives a resource request and the signed access token transmitted from the client, a confirmation unit configured to confirm whether a region of the resource server is included in the signed access token by comparing a region included in the signed access token and the region of the resource server, and an execution unit configured to execute processing with respect to the resource request in a case where the determination unit determines that the signed access token is valid and the confirmation unit confirms that the region of the resource server is included in the signed access token.

Further features of the present disclosure will become apparent from the following description of exemplary embodiments with reference to the attached drawings.

BRIEF DESCRIPTION OF THE DRAWINGS

FIGS. 3A to 3C are block diagrams illustrating module configurations according to the first exemplary embodiment.

FIG. 5 is a flowchart illustrating an access token request flow according to the first exemplary embodiment.

FIGS. 8A and 8B are diagrams illustrating examples of screens according to the first exemplary embodiment.

FIG. 9 is a block diagram illustrating a module configuration according to a second exemplary embodiment.

DESCRIPTION OF THE EMBODIMENTS

Figure 1:
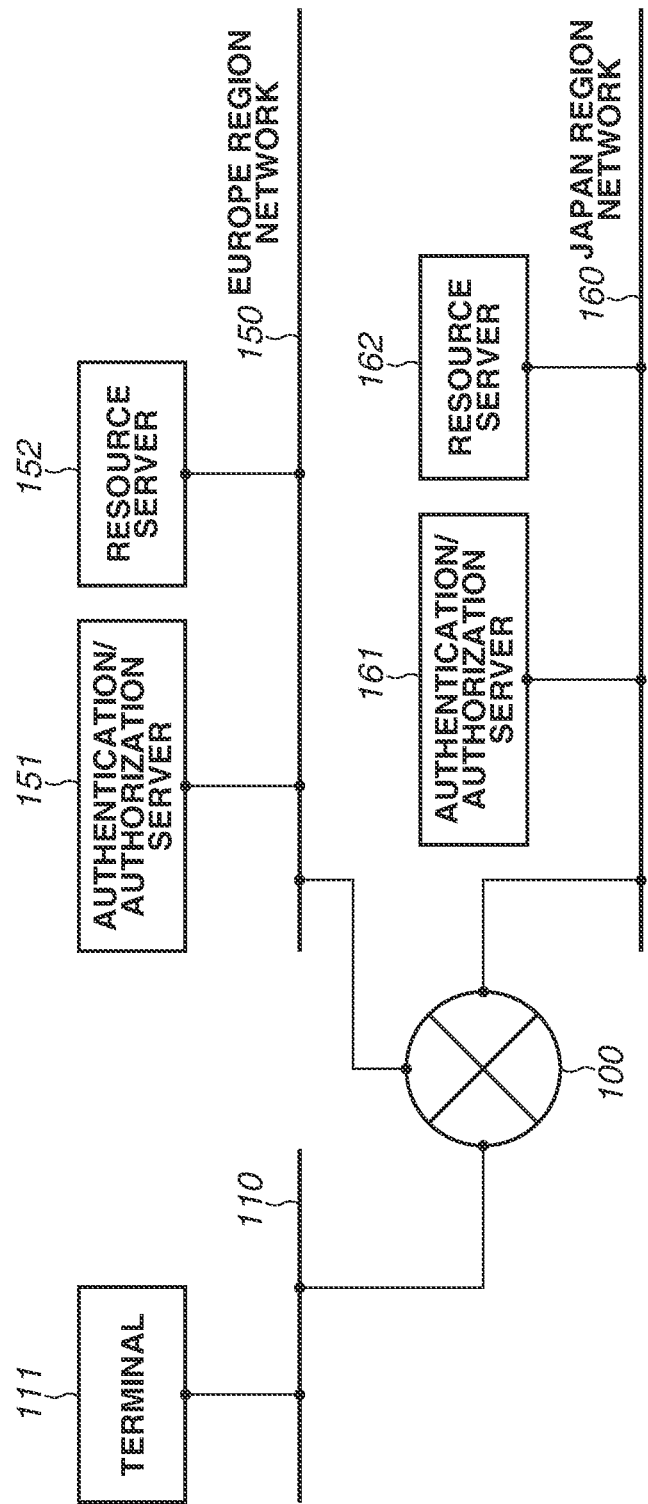
FIG. 1 is a block diagram illustrating a network configuration.

A region in a cloud service refers to each of geographically divided regions. The regions may be divided in any dividing unit such as an area, a country, or a community. Since each of the regions is configured of a server group independent from one another, an authorization server also independently exists in each of the regions. Further, an access token is issued when an OAuth owner as an owner of a resource permits delegation of authority through an authorization server of a corresponding region. Similar to the authorization server that exists in each of the regions, a resource server also exists in each of the regions.

Herein, there is provided a system called "GeoDNS," that is a technique for returning, as a response to an access destination name solution request, an internet protocol (IP) address of a server geographically close to the request source. Further, a system which enables a public key of an authorization server to be shared between regions and used by a resource server of any of the regions is taken into consideration. Through the above system, the OAuth client to which the authority of the OAuth owner has been delegated can use the access token issued in another region to access a resource server in a region geographically close thereto. By accessing the resource server in the region geographically close thereto, a network delay can be reduced in comparison to the case of accessing a resource server in another region. This is important for a device such as an internet-of-things (IoT) device which uploads data whenever necessary instead of uploading data by batch processing by date and time.

On the other hand, servers installed in respective regions and data stored in the servers are required to be managed according to certain rules such as the regulations of the countries where the respective regions exist. In Europe, for example, a regulation about personal data called General Data Protection Regulation (GDPR) has been put into effect, and thus it is necessary to comply with the GDPR in the regions in Europe. As described above, since there is such a regulation about delegation of personal data to the outside of the region, data associated with the user has to be uploaded to a resource server in a region corresponding to an area where the user mainly resides in, instead of a resource server geographically close thereto. Accordingly, the OAuth client should select an appropriate region as a data transmission destination according to data content while giving consideration to the regulation of each of the regions.

However, there is a possibility that some of the OAuth clients may not control to which destination data is to be transmitted. Further, verification is executable even if the signature is affixed by an authorization server in another region. Therefore, as long as the signature is valid, the resource server will accept the uploaded data even if that data is user data transmitted from any region. In order to comply with regulations about data delegation in respective regions, occurrence of the above-described situation should be prevented.

The present disclosure is directed to a technique of controlling a resource server to accept user data of only a region corresponding to an area where the user mainly resides while deconcentrating a processing load for verifying an access token.

Hereinafter, an exemplary embodiment will be described with reference to the appended drawings. A first exemplary embodiment will be described. An access control system according to the present exemplary embodiment is realized on a network having a configuration illustrated in FIG. 1. In the present exemplary embodiment, a World Wide Web (WWW) system is established on a wide area network (WAN) 100. Local area networks (LANs) 110, 150, and 160 connect constituent elements. Herein, the LAN 150 and the LAN 160 respectively exist in a Europe region in Europe and a Japan region in Japan.

An authentication/authorization server 151 executes authentication and authorization of a user and issuance and verification of an authentication token and an access token. A resource server 152 manages resources. The authentication token certifies a certain user as a valid user of the system. The access token certifies that the owner of the resource permits a client such as an application to execute a certain operation, and the access token is issued when the owner of the resource authorizes the application to access to the resource. For example, when the application uses an access token for accessing the resource managed by a cloud service, the application can access the resource within a range permitted for the user.

The authentication/authorization server 151 and the resource server 152 exist and operate in the Europe region. Similarly, an authentication/authorization server 161 and a resource server 162 exist in the Japan region. An application is operated on a terminal 111. The authentication/authorization server 151 and the resource server 152 are connected to the WAN 100 via the LAN 150, and the authentication/authorization server 161 and the resource server 162 are connected to the WAN 100 via the LAN 160. Similarly, the terminal 111 is connected to the WAN 100 via the LAN 110.

The authentication/authorization server 151 and the resource server 152 may be established on different LANs or the same LAN, or may be established on the same personal computer (PC) or server computer. Although each of the authentication/authorization server 151 and the resource server 152 is illustrated as a single server unit in FIG. 1, each of the authentication/authorization server 151 and the resource server 152 may be a server system configured of a plurality of servers. For example, the authentication/authorization server 151 may be configured of a plurality of clustered servers. Similarly, the authentication/authorization server 161 and the resource server 162 may be established on different LANs or the same LAN, or may be established on the same PC or server computer. Although each of the authentication/authorization server 161 and the resource server 162 is illustrated as a single server unit in FIG. 1, each of the authentication/authorization server 161 and the resource server 162 may be a server system configured of a plurality of servers. For example, the authentication/authorization server 161 may be configured of a plurality of clustered servers. Further, in the present disclosure, "server system" refers to an apparatus configured of at least one server which provides a specific service.

Figure 2:
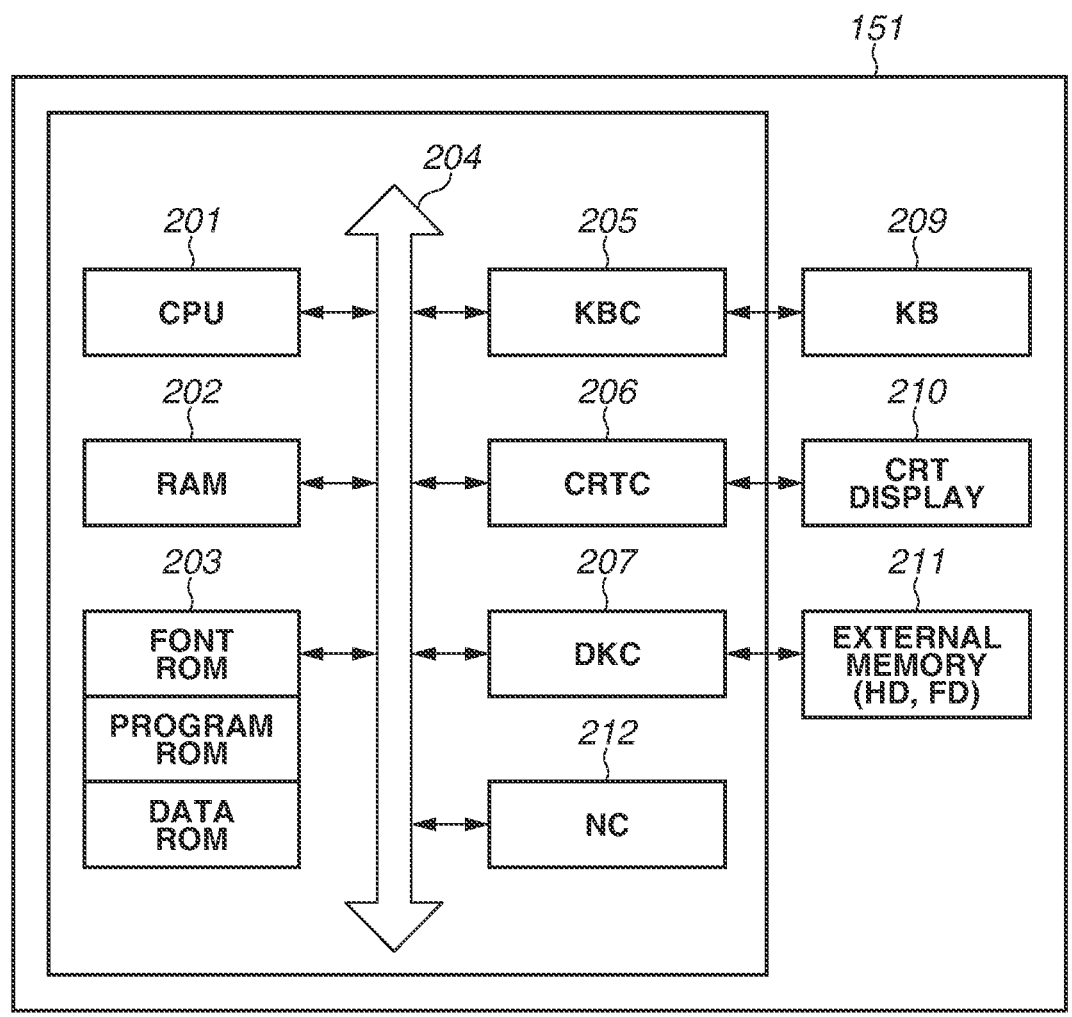
FIG. 2 is a block diagram illustrating a configuration of a server computer according to a first exemplary embodiment.

A data management system according to the present exemplary embodiment is realized on a system configured of a PC as illustrated in FIG. 2. FIG. 2 is a diagram illustrating a configuration of the authentication/authorization server 151 according to the present exemplary embodiment. Configurations of the resource server 152, the authentication/authorization server 161, the resource server 162, and the terminal 111 are also similar to the configuration of the authentication/authorization server 151. In addition, the hardware block diagram illustrated in FIG. 2 corresponds to a hardware block diagram of a general information processing apparatus, and such a hardware configuration of a general information processing apparatus can be applied to the server computer or the terminal according to the present exemplary embodiment.

In FIG. 2, a central processing unit (CPU) 201 executes a program such as an operating system (OS) and an application stored in a program read only memory (ROM) of a ROM 203 or loaded onto a random access memory (RAM) 202 from a hard disk (HD) 211. Herein, the OS refers to an operating system operating on a computer. Processing of each of the flowcharts described below is realized by executing this program. The RAM 202 functions as a main memory or a work area of the CPU 201. A keyboard controller (KBC) 205 controls a key input executed through a keyboard (KB) 209 or a pointing device (not illustrated). A cathode-ray tube controller (CRTC) 206 controls display of a CRT display 210. A disk controller (DKC) 207 controls an access to data stored in the HD 211 or a Floppy (registered trademark) disk (FD) 211 for storing various types of data. A network controller (NC) 212 is connected to the network and executes control processing for communicating with the other devices connected to the network.

In the below-described exemplary embodiment, unless otherwise specified, the CPU 201 plays a main role on the execution hardware, and an application program installed in the HD 211 plays a main role on software.

FIGS. 3A, 3B, and 3C are diagrams respectively illustrating module configurations of the authentication/authorization server 151, the resource server 152, and the terminal 111 according to the present exemplary embodiment. In addition, configurations of the authentication/authorization server 161 and the resource server 162 are similar to those of the authentication/authorization server 151 and the resource server 152, respectively. The authentication/authorization server 151 includes an authentication module 301, an authorization module 302, an authorized scope management module 303, and an access token issuance module 304. The authentication/authorization server 151 further includes a client public key management module 305, an authentication/authorization server secret key management module 306, a region determination module 310, a user management module 311, and a client management module 312. The resource server 152 includes a resource access processing module 351, a region storing module 352, and an authentication/authorization server public key management module 353. The terminal 111 includes an access token request module 391, a credential management module 392, and a resource request module 393.

According to an authentication request from a user, the authentication module 301 executes user authentication and issuance of an authentication token. Similarly, according to the authorization operation executed by the user, the authorization module 302 displays an authorization confirmation screen and prompts a user to delegate authority. The authorized scope management module 303 stores an authorized scope within which the user has delegated the authority. The access token issuance module 304 issues an access token according to an access token request transmitted from the access token request module 391 of the terminal 111. At this time, the access token request is signed with a client secret key managed by the credential management module 392 of the terminal 111. Further, the signature is verified using a public key managed by the client public key management module 305. The access token issued at this point of time includes region information determined by the region determination module 310, and signed with a secret key of the authentication/authorization server 151 managed by the authentication/authorization server secret key management module 306. Validity of content of the access token signed with the secret key of the authentication/authorization server 151 can be verified using the corresponding public key. The user management module 311 and the client management module 312 respectively manage a user and a client who use the authentication/authorization server 151.

The resource access processing module 351 receives a resource request from the resource request module 393 of the terminal 111. The resource access processing module 351 having received the resource request compares region information stored in the region storing module 352 to region information described in the access token. Further, the resource access processing module 351 executes signature verification by using the public key of the authentication/authorization server 151 managed by the authentication/authorization server public key management module 353, and normally processes the resource request determined to be valid.

Figure 4A:
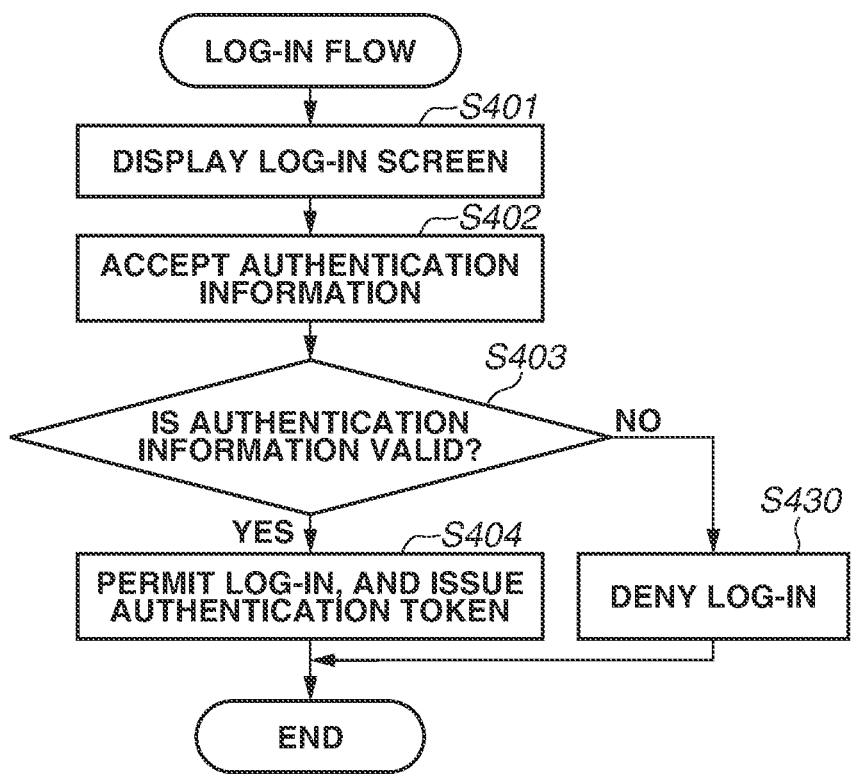
FIGS. 4A and 4B are flowcharts illustrating a log-in flow and an authorization flow according to the first exemplary embodiment.

FIG. 4A is a flowchart illustrating a log-in flow executed by the authentication/authorization server 151 according to the present exemplary embodiment. This processing flow is started when the authentication/authorization server 151 receives a log-in request from the user. In step S401, the authentication module 301 displays a log-in screen 1001 illustrated in FIG. 8A. In step S402, the authentication module 301 accepts authentication information input through the use of the log-in screen 1001. In step S403, the authentication module 301 determines whether the authentication information accepted in step S402 is valid, and determines whether the user who has transmitted the log-in request is an authenticated valid user. If the authentication information is determined to be valid (YES in step S403), the processing proceeds to step S404. If the authentication information is determined to be invalid (NO in step S403), the processing proceeds to step S430.

In step S404, the authentication module 301 permits log-in of the user and issues an authentication token, and the processing flow is ended. In step S430, the authentication module 301 denies log-in of the user and ends the processing flow. In addition, a general log-in flow can be applied to the log-in flow of the present exemplary embodiment.

Figure 4B:
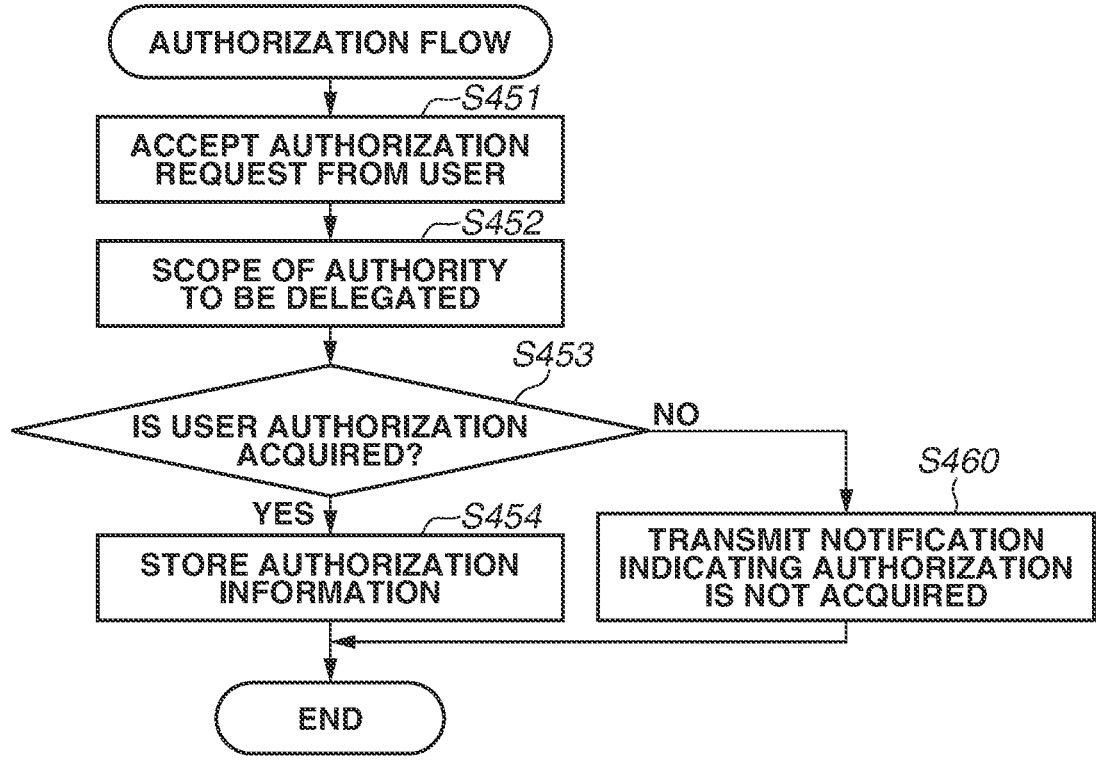

FIG. 4B is a flowchart illustrating an authorization flow executed by the authentication/authorization server 151 according to the present exemplary embodiment. This processing flow is started when the authorization module 302 of the authentication/authorization server 151 receives an authorization request from the user. In step S451, the authorization module 302 accepts an authorization request from the user. The authorization request accepted in step S451 includes information about a client as an authority delegation destination and information about a scope of authority to be delegated.

In step S452, the authorization module 302 displays an authorization confirmation screen 1002 illustrated in FIG. 8B and requests confirmation of the user. In step S453, the authorization module 302 determines whether authorization of the user has been acquired in step S452. If the authorization module 302 determines that the authorization is acquired (YES in step S453), the processing proceeds to step S454. If the authorization module 302 determines that the authorization is not acquired (NO in step S453), the processing proceeds to step S460. An operation for giving the authority by selecting a permission on the screen 1002 in FIG. 8B is called as an authorization operation. When the authorization operation is executed by the user, issuance of the access token can be executed through the processing flow in FIGS. 6A and 6B described below. Further, content authorized through the above operation, i.e., a range of accessible resources, is called as "scope".

In step S454, the authorized scope management module 303 stores the content of authorization executed in step S452 in an authorized scope table, and the processing is ended. Table 1 illustrates an example of information stored in the authorized scope table.

TABLE 1

| User Identifier | Client Identifier | Authorized Scope |
| --- | --- | --- |
| User001 | Client001 | ScopeA ScopeB |
| User001 | Client002 | ScopeC |
| User002 | Client002 | ScopeA |
| . | . | . |
| . | . | . |
| . | . | . |

In the table 1, for example, a user represented by a user identifier "User001" authorizes a client represented by a client identifier "Client001" to access "ScopeA" and "ScopeB". In step S460, the authorization module 302 transmits a notification indicating that authorization has not been acquired, and the processing is ended. In addition, a general authorization flow can be applied to the authorization flow according to the present exemplary embodiment.

FIG. 5 is a flowchart illustrating an access token request flow executed by the terminal 111 according to the present exemplary embodiment. This processing flow is started by a user operation, a schedule set to the terminal 111, or an event of some kind as a trigger. Hereinafter, the processing flow in FIG. 5 will be described with an example in which the terminal 111 requests the access token from the authentication/authorization server 151 existing in the Europe region.

In step S501, according to the trigger, the access token request module 391 determines a scope necessary for the processing to be executed. Herein, for example, it is assumed that the Scopes A and B are necessary. In step S502, the access token request module 391 takes out a client secret key from the credential management module 392. Table 2 illustrates an example of credential information managed by the credential management module 392.

TABLE 2

| Client Identifier | Client Secret Key | Client Key ID |
| --- | --- | --- |
| Client001 | Bk3TLDfozc4F | Client001Key1 |

In the table 2, an identifier of the client is described as "Client001", and a client secret key and a client key ID are described as "Bk3TLDfozc4F" and "Client001Key1", respectively. In step S503, the access token request module 391 generates an access token request and affixes a signature thereto using the client secret key taken out in step S502. An example of the access token request will be illustrated below. The access token request is described in the JWT format.

```
{
"kid": "Client001Key1",
"typ":"JWT",
"alg": "RS256"
}
{
"iss": "Client001",
"sub": "User001",
"aud": "https://europe.authorization.example.com/",
"exp": 1508890200,
"iat": 1508889600,
"jti": "01234567890123456789012345678901234567890123456789",
"authz:scopes": [
"ScopeA",
"ScopeB"
]
}
```

The access token request module 391 attaches the above hash value to the access token request to which the signature is affixed using the client secret key, and transmits the access token request.

In the above example of the access token request, "kid" represents a client key ID of the signature affixed to the access token request. The algorithm used for the signature is represented as "alg". Herein, "alg" indicates that "RS256" (i.e., the Rivest-Shamir-Adleman Signature Scheme with Appendix (RSASSA) based on the Public-Key Cryptography Standards version 1.5 (PKCS1 V1_5) using the Secure Hash Algorithm 256-bit (SHA-256)) is used. Further, "typ" indicates that the access token request is written in the "JWT" format. Each of the other items indicate as follows. "Iss" indicates an identifier of the issuer of the JWT, "sub" indicates an identifier of the entity as a subject of the JWT, and "aud" indicates a list of identifiers of entities assumed to use the JWT. Further, "exp" indicates a validity period of the JWT, "iat" indicates an issuance date and time of the JWT, "jti" indicates an identifier unique to the JWT, and "authz: scopes" indicates a scope expected to be included in the requested access token. The date and time described in each of "exp" and "iat" indicates an IntDate value which is a JSON numeric value representing a number of seconds measured from 1970-01-01T0:0:0Z in coordinated universal time (UTC) until the specified date and time in UTC. A format of the access token request according to the present exemplary embodiment is not limited to the above, and a general format is also applicable.

In the above example, "iss", the issuer of the JWT, is "Client001", and the access token by which the authority of "User001" described in "sub" has been delegated, is requested to the authentication/authorization server 151 in Europe represented by the URI described in "aud". "ScopeA" and "ScopeB" described in "authz:scopes" are the scopes representing ranges of the requested authority. This access token request is issued on Oct. 25, 2017 at 0:0:0 (UTC), and the issuance date and time is represented by a value "1508889600" described in "iat". Further, the validity period is Oct. 25, 2017 at 0:10:0 (UTC), represented by a value "1508890200" described in "exp".

In terms of the OAuth, the OAuth client who receives the delegated authority is described in "iss". Therefore, a client identifier of the client who requests the access token is used therein. Further, the OAuth owner who delegates the authority is described in "sub". The OAuth owner may be a user who executes an authorization operation in the processing flow illustrated in FIG. 4B, or may be the client that requests the access token itself. Further, the client may or may not belong to a tenant the same as the tenant where the user belongs.

In step S504, the access token request module 391 transmits the signed access token request generated in step S503 to the authentication/authorization server 151. In step S505, the access token request module 391 receives, from the authentication/authorization server 151, an access token as a response to the access token request transmitted in step S504, and the processing flow is ended.

Figure 6B:
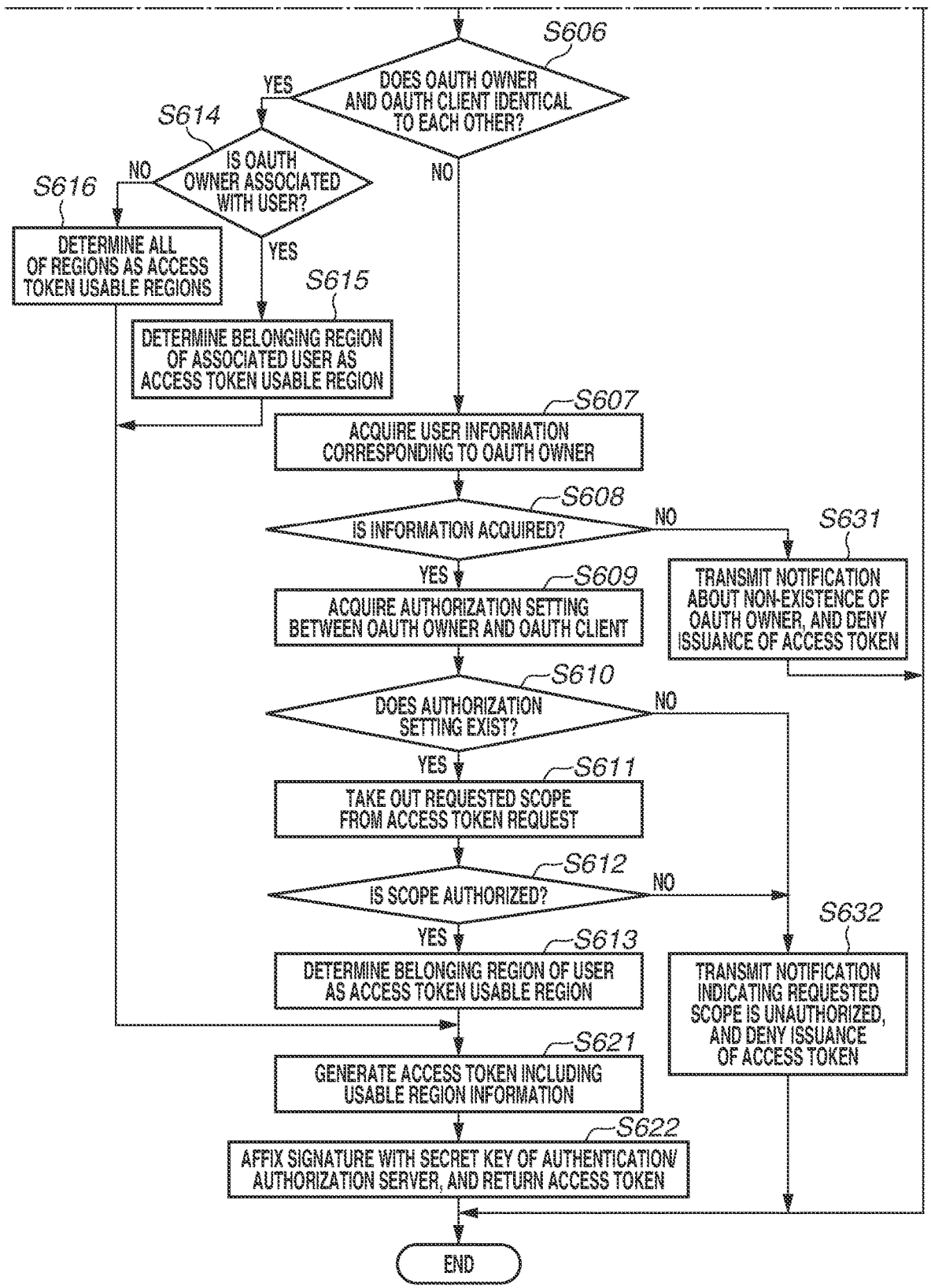
FIG. 6, consisting of FIGS. 6A and 6B, is a flowchart illustrating an access token issuance flow according to the first exemplary embodiment.

FIGS. 6A and 6B (hereinafter collectively referred to as FIG. 6) are each a flowchart illustrating an access token issuance flow executed by the authentication/authorization server 151 according to the present exemplary embodiment. This processing flow is started when the authentication/authorization server 151 receives the access token request transmitted from the access token request module 391 of the terminal 111 in step S504 of FIG. 5. Although the access token issuance flow will be described below as a processing flow executed by the authentication/authorization server 151 in the Europe region, the access token issuance flow similar to the above will be executed when the authentication/authorization server 161 in the Japan region has received the access token request.

In step S601, the access token issuance module 304 takes out the client key ID included in the received access token request. In step S602, the access token issuance module 304 takes out a client public key and a client identifier from the client public key management module 305 based on the client key ID taken out in step S601. Table 3 illustrates an example of a client public key management table managed by the client public key management module 305.

TABLE 3

| Client Key ID | Client Identifier | Client Public Key |
|---|---|---|
| Client001Key1 | Client001 | ZRU + 5w/CmH7/ |
| Client002Key2 | Client002 | 6g/bxHldrS87 |
| . | . | . |
| . | . | . |
| . | . | . |

According to the table 3, if the client key ID taken out in step S601 is "Client001Key1", the client identifier and the client public key taken out are "Client001" and "ZRU+5w/CmH7/", respectively.

In step S603, the access token issuance module 304 verifies the signature affixed on the access token request received at the beginning of this processing flow with the client public key taken out in step S602. In addition, the access token issuance module 304 also verifies whether the identifier described in "iss" included in the access token request is identical to the client identifier taken out in step S602. In step S604, the access token issuance module 304 determines whether the verification result acquired in step S603 is valid. If the verification result is determined to be valid (YES in step S604), the processing proceeds to step S605. If the verification result is determined to be invalid (NO in step S604), the processing proceeds to step S630.

In step S605, the access token issuance module 304 takes out OAuth owner information and OAuth client information from the access token request received at the beginning of the processing flow. The respective pieces of information are described in "sub" and "iss" of the access token request. In step S606, the access token issuance module 304 determines whether the pieces of information about the OAuth owner and the OAuth client taken out in step S605 are identical to each other. If the pieces of information are determined to be different from each other (NO in step S606), the processing proceeds to step S607. If the pieces of information are determined to be identical to each other (YES in step S606), the processing proceeds to step S614.

In step S607, the access token issuance module 304 inquires of the user management module 311 about the information about the OAuth owner described in "sub" of the access token request. Table 4 illustrates an example of a user management table managed by the user management module 311.

TABLE 4

| User Identifier | Belonging Tenant | Belonging Region |
|---|---|---|
| User001 | 1001E | Europe |
| User002 | 1002E | Europe |
| . | . | . |
| . | . | . |
| . | . | . |

Herein, since the authentication/authorization server 151 in the Europe region is described, user information managed by the user management module 311 is the user information of the authentication/authorization server 151 in the Europe region. With respect to the authentication/authorization server 161 in the Japan region, user information managed by the user management module 311 is the user information of the authentication/authorization server 161 in the Japan region.

In step S608, the access token issuance module 304 determines whether information about the OAuth owner is acquired in step S607. If the access token issuance module 304 determines that the information is acquired (YES in step S608), the processing proceeds to step S609. If the access token issuance module 304 determines that the information is not acquired (NO in step S608), the processing proceeds to step S631. If the information about the OAuth owner is acquired from the user management module 311, in steps S609 to S613, the access token issuance module 304 executes the processing, treating the OAuth owner as a user.

In step S609, the access token issuance module 304 takes out the authorized scope relating to the OAuth owner and the OAuth client taken out in step S605 from the authorized scope management module 303. Specifically, the scope can be acquired if the authorization information has been stored in the authorization flow in FIG. 4B. For example, if the OAuth owner is "User001", and the OAuth client is "Client001", "ScopeA" and "ScopeB" are taken out as the authorized scope information.

In step S610, when the authorization information has been stored through the authorization flow, the access token issuance module 304 determines whether the authorization setting exists. If the authorization setting exists (YES in step S610), the processing proceeds to step S611. If the authorization setting does not exist (NO in step S610), the processing proceeds to step S632. In step S611, the access token issuance module 304 takes out the requested scope from the access token request received at the beginning of the processing flow.

In step S612, the access token issuance module 304 determines whether the requested scope taken out in step S611 is authorized. Specifically, the access token issuance module 304 determines whether the requested scope taken out in step S611 is included in the authorized scope taken out in step S609. If the requested scope is determined to be authorized (YES in step S612), the processing proceeds to step S613. If the requested scope is determined to be unauthorized (NO in step S612), the processing proceeds to step S632. For example, if "ScopeA" and "ScopeB" are taken out as the authorized scopes in step S609, whereas "ScopeA" and "ScopeB" are also taken out as the requested scopes in step S611, the access token issuance module 304 determines that the requested scopes are authorized.

In step S613, the region determination module 310 determines a region to which the user acquired in step S607 belongs as an access token usable region. This is because the OAuth owner information has been acquired from the user management module 311, and thus the processing is executed while treating the OAuth owner as the user. In a case where the OAuth owner is the user, it is necessary to control the access token to be used only in the region to which the user belongs. When the usable region of the access token is determined, the processing proceeds to step S621.

Meanwhile, in step S614, the region determination module 310 determines whether the OAuth client taken out in step S605 is associated with the user. As a result of the determination, if the OAuth client is associated with the user (YES in step S614), the processing proceeds to step S615. If the OAuth client is not associated with the user (NO in step S614), the processing proceeds to step S616.

For example, the following processing will be executed in order to determine whether the OAuth owner is associated with the user. First, the region determination module 310 acquires client information from the client management module 312 by using the identifier of the entity described in "sub" of the access token request. Table 5 illustrates an example of the client management table managed by the client management module 312. For example, since "User001" as a specific user is associated with the belonging tenant "1001E", it is assumed that the user data can be operated by a client belonging to the tenant.

TABLE 5

| Client Identifier | Belonging Tenant |
| --- | --- |
| Client001 | 1001E |
| Client002 | 9999E |
| . | . |
| . | . |
| . | . |

Next, based on the belonging tenant described in the acquired client information, the region determination module 310 confirms with the user management module 311 whether there is a user belonging to the same tenant. If the user information is associated with the belonging tenant of the client, it is assumed that the above-described client can operate the user data. Therefore, the usable region of the access token has to be restricted. As described above, the region determination module 310 determines whether the client as the OAuth owner is associated with the user depending on whether the client belongs to the tenant where the user exists.

However, a method of determining whether the OAuth owner as the client is associated with the user is not limited to the above-described method. For example, the determination may be made by confirming a correspondence relationship between the tenant to which the OAuth owner as the client belongs and the tenant to which the user belongs, or another method may be also employed. In step S615, the region determination module 310 takes out, from the user management module 311, information about the user determined to be associated with the OAuth owner as a client in step S614. Further, the region determination module 310 determines the belonging region described in the acquired user information as the access token usable region. When the access token usable region is determined, the processing proceeds to step S621.

In step S616, since it is determined that the OAuth owner as a client is not associated with the user in step S614, the region determination module 310 determines not to restrict the access token usable region. Therefore, the region determination module 310 determines all of the regions as the access token usable regions. When the access token usable region is determined, the processing proceeds to step S621. In step S621, the access token issuance module 304 generates an access token including the information about the usable region determined in any one of the steps S612, S615, and S616.

In step S622, the access token issuance module 304 takes out the secret key of the authentication/authorization server 151 from the authentication/authorization server secret key management module 306, and generates a signature for the access token generated in step S621. Further, the access token issuance module 304 transmits the access token affixed with the generated signature to the access token request module 391 of the terminal 111, and the processing flow is ended. Table 6 illustrates the authentication/authorization server secret key information managed by the authentication/authorization server secret key management module 306.

TABLE 6

| Authorization Server Key ID | Secret Key |
| --- | --- |
| EuropeKey1 | ZXEnQihoisio |

Since the authentication/authorization server 151 in the Europe region is described herein, the secret key information managed by the authentication/authorization server secret key management module 306 is the secret key information of the authentication/authorization server 151 in the Europe region. With respect to the authentication/authorization server 161 in the Japan region, the secret key information managed by the authentication/authorization server secret key management module 306 is the secret key information of the authentication/authorization server 161 in the Japan region.

An example of the access token transmitted in step S613 will be illustrated below. The access token is described in the JWT format. As described above, an access token used for an access token verification executed by the resource server is called as "signed access token". In the present exemplary embodiment, the signed access token is simply called as "access token". In a case where the signed access token has to be distinguished from the normal access token, such explanation is given.

```
{
"kid": "EuropeKey1",
"typ":"JWT",
"alg": "RS256"
}
{
"iss": "https://europe.authorization.example.com/",
"sub": "User001",
"aud": "https://europe.resource.example.com/",
"exp": 1508893210,
"iat": 1508889610,
"jti": "9876543210987654321098765432109876543210",
"authz:scopes": [
"ScopeA",
"ScopeB"
]
}
```

The above hash value signed with a secret key of the authentication/authorization server 151 is returned to the access token request module 391.

Herein, description with respect to a portion common to the access token request will be omitted, and characteristics of the access token will be described. Because the access token is signed with a secret key of the authentication/authorization server 151 in the Europe region, "EuropeKey1" is described in "kid". Further, the issuance of the access token described in "iss" represents the authentication/authorization server 151. Information indicating the Europe region is described in "aud" as the user of the access token, so that the access token usable region is restricted. Herein, although the URI of the resource server 152 is described in "aud", a method for expressing the region is not limited to the above-described method, and the region may be expressed by a plurality of pieces of information. Further, "authz:scopes" represents the range of the delegated authority. Herein, "ScopeA" and "ScopeB" are delegated.

In step S630, the access token issuance module 304 transmits a notification indicating that the signature is invalid to the access token request module 391 of the terminal 111 and denies issuance of the access token, and then the processing flow is ended. In step S631, the access token issuance module 304 transmits a notification indicating that an OAuth owner does not exist to the access token request module 391 of the terminal 111 and denies issuance of the access token, and then the processing flow is ended. In step S632, the access token issuance module 304 transmits a notification indicating that the requested scope is unauthorized, to the access token request module 391 of the terminal 111 and denies issuance of the access token, and then the processing flow is ended.

Figure 7:
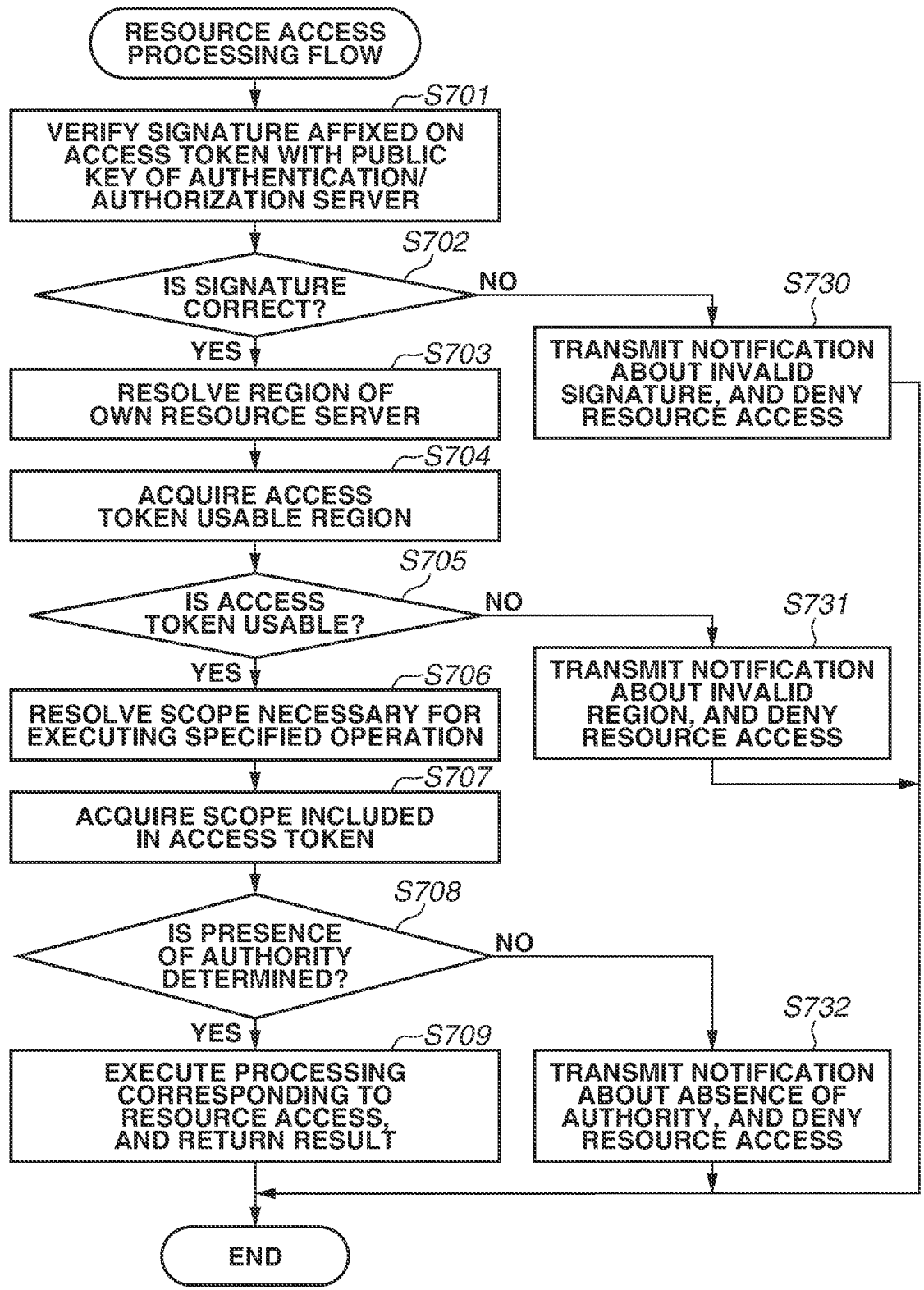
FIG. 7 is a flowchart illustrating resource access processing according to the first exemplary embodiment.

FIG. 7 is a flowchart illustrating a resource access processing flow executed by the resource server 152 according to the present exemplary embodiment. This processing flow is started when the resource access processing module 351 of the resource server 152 receives a resource access request from the resource request module 393 of the terminal 111. Although the resource access processing flow will be described below as a processing flow executed by the resource server 152 in the Europe region, a resource access processing flow similar to the above will be executed when the resource server 162 in the Japan region has received the resource access request.

In step S701, the resource access processing module 351 verifies the signature of the access token received at the beginning of this processing flow. Specifically, the resource access processing module 351 acquires the public key of the authentication/authorization server 151 described in "kid" of the access token from the authentication/authorization server public key management module 353 and verifies the signature. Table 7 illustrates an example of the authentication/authorization server public key table managed by the authentication/authorization server public key management module 353.

TABLE 7

| Authorization Server Key ID | Public Key |
| --- | --- |
| EuropeKey1 | kakFOhqtzdAE |
| EuropeKey2 | LEba4CQYGB5C |

In step S702, the resource access processing module 351 confirms whether the signature is determined to be valid and correct in step S701. If the signature is determined to be correct (YES in step S702), the processing proceeds to step S703. If the signature is determined to be incorrect (NO in step S702), the processing proceeds to step S730.

In step S703, the resource access processing module 351 acquires a region of the resource server 152 itself from the region storing module 352 to resolve the region to which the resource server 152 itself belongs. In step S704, the resource access processing module 351 acquires the access token usable region from the access token included in the resource access request received at the beginning of the processing flow. For example, if a uniform resource locator (URL) is described as "https://europe.resource.example.com/" in "aud" of the access token, the Europe region can be acquired as the access token usable region based on the character string included in the URL. Further, if a URL is described as "https://www.resource.example.com/" in "aud" of the access token, information indicating all of the regions can be acquired as the access token usable regions based on the character string included in the URL. In addition, a method for acquiring the access token usable region is not limited to the above-described method.

In step S705, the resource access processing module 351 compares the own region of the resource server 152 acquired in step S703 and the access token usable region acquired in step S704, and determines whether the access token is usable. If the access token is determined to be usable (YES in step S705), the processing proceeds to step S706. If the access token is determined to be unusable (NO in step S705), the processing proceeds to step S731. For example, it is assumed that the Europe region is the own region of the resource server 152. The access token is determined to be usable in a case where the Europe region or information indicating all of the regions is acquired as the access token usable region in step S704. Further, the access token is determined to be unusable in a case where the Japan region is acquired as the access token usable region in step S704, and the Europe region is not included therein.

In step S706, the resource access processing module 351 resolves the scope necessary for the processing requested from the resource request module 393 of the terminal 111. In step S707, the resource access processing module 351 acquires the scope included in the access token received at the beginning of the processing flow. This value can be acquired from a value described in "authz:scopes" of the access token.

In step S708, the resource access processing module 351 compares the scope determined to be necessary in step S706 and the scope included in the access token acquired in step S707, and determines presence or absence of authority. If presence of authority is determined (YES in step S708), the processing proceeds to step S709. If absence of authority is determined (NO in step S708), the processing proceeds to step S732. For example, presence of authority is determined if "ScopeA" is determined as the necessary scope in step S706 and "ScopeA" and "ScopeB" are acquired as the scopes included in the access token in step S707.

In step S709, the resource access processing module 351 executes the processing requested from the resource request module 393 of the terminal 111 and returns a processing result to the resource request module 393, and the processing flow is ended. In step S730, the resource access processing module 351 transmits a notification indicating the signature is invalid and denies the resource access, and the processing flow is ended. In step S731, the resource access processing module 351 transmits a notification indicating that the region is invalid and denies the resource access, and the processing flow is ended. In other words, the client cannot access the resource server of the region as a transmission destination of the resource request. In step S732, the resource access processing module 351 transmits a notification indicating that the authority is inadequate and denies the resource access, and the processing flow is ended.

According to the present exemplary embodiment, while a load of access token verification processing is deconcentrated, only the user data of the region corresponding to the area where the user mainly reside in can be accepted. Further, a resource server geographically close to the client is accessible if the user data is not operated through the access, so that reduction in the network delay can be achieved.

Next, a second exemplary embodiment will be described with reference to the appended drawings. Hereinafter, the description of a configuration common to the configuration described in the first exemplary embodiment will be omitted, and only differences from the first exemplary embodiment will be described. Because the region can be divided in any division unit such as a district, a country, or a community, a plurality of regions may be included in the same country and thus regulated by a common regulation. In such a case where the plurality of regions exists, convenience thereof will be improved if an access token issued by one server can be used by another server. For example, even in a case where an access token is issued by an authentication/authorization server in Berlin, Germany, the access token may be actually used in an area near Hamburg, Germany. In such a case, it is preferable that user data stored in a resource server in in the Hamburg region be accessible with an access token issued by an authentication/authorization server in the Berlin region.

FIG. 9 is a block diagram illustrating a module configuration of the authentication/authorization server 151 according to the second exemplary embodiment. A configuration of the authentication/authorization server 161 may be similar to that of the authentication/authorization server 151. The authentication/authorization server 151 includes an additional region determination module 313 and a region correspondence management module 314 in addition to the modules described in the first exemplary embodiment. The additional region determination module 313 makes an inquiry to the region correspondence management module 314 to acquire an additional region corresponding to the region determined by the region determination module 310. The additional region determination module 313 adds the acquired additional region and determines the access token usable region.

Figure 10:
FIG. 10, consisting of FIGS. 10A and 10B, is a flowchart illustrating access token issuance flow according to the second exemplary embodiment.
Figure 10A:
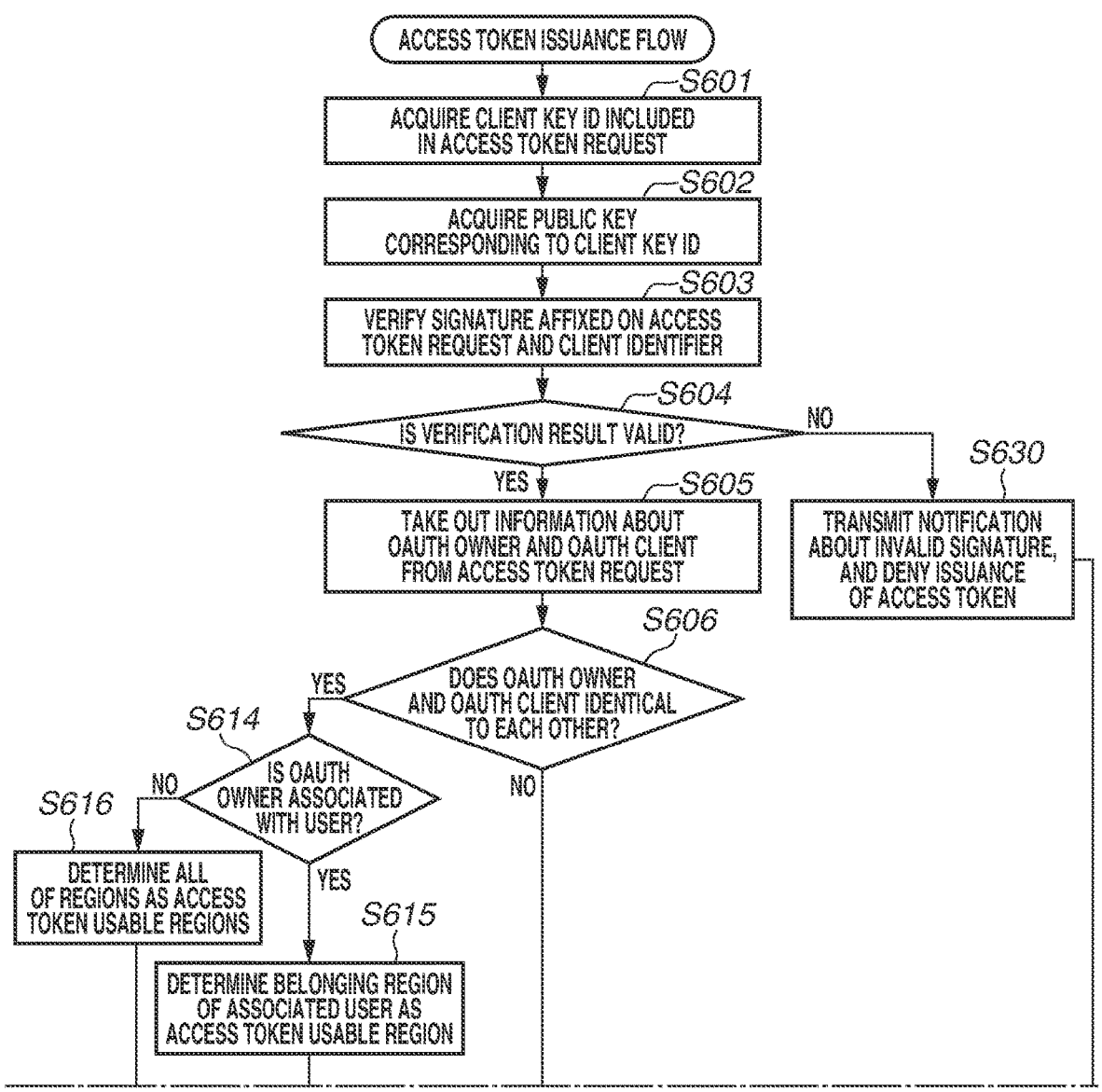
Figure 10B:
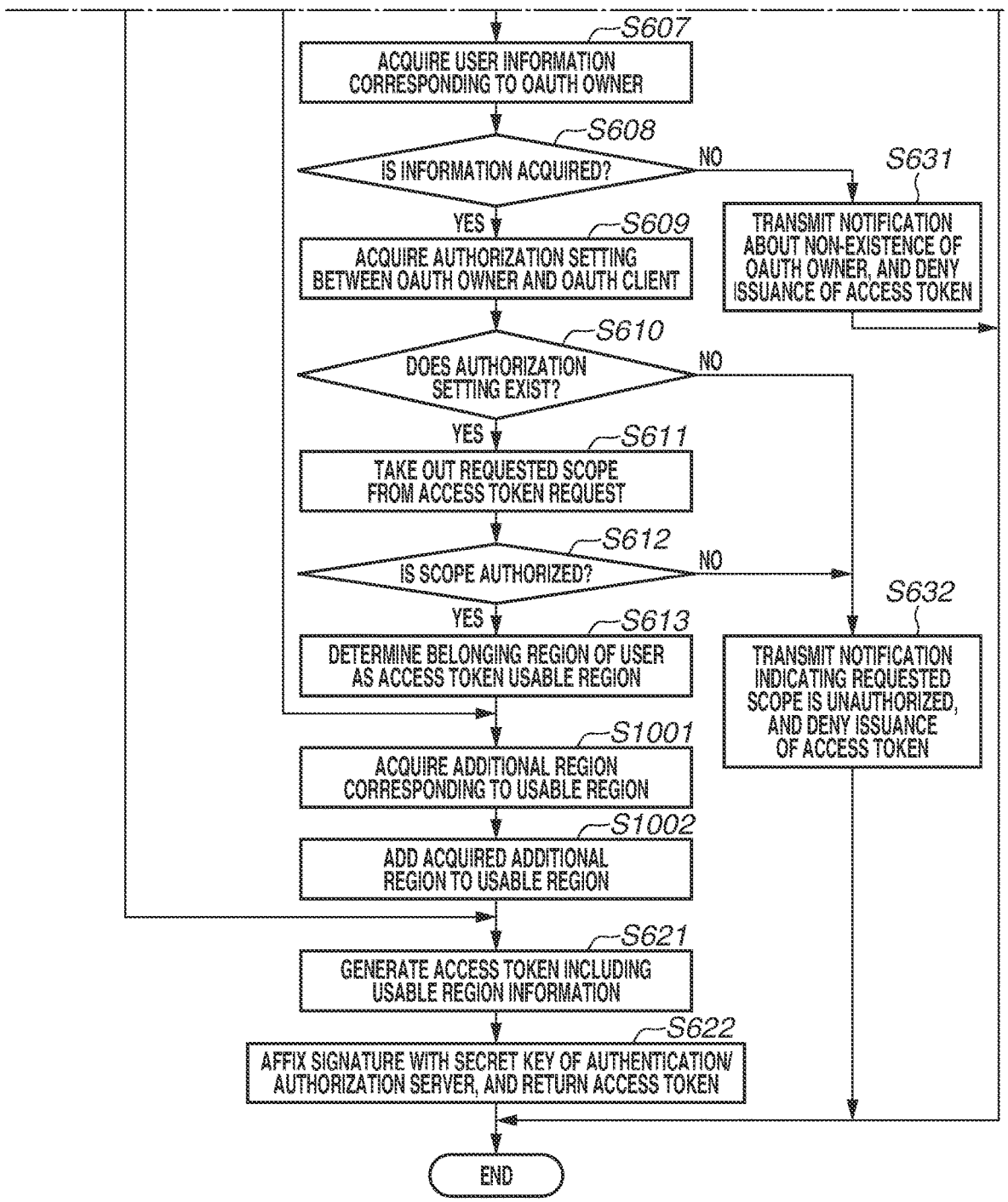

FIG. 10, consisting of FIGS. 10A and 10B, is a flowchart illustrating a processing flow for including the additional region and determining the access token usable region according to the present exemplary embodiment. In this processing flow, the processing in step S1001 will be executed after the processing in steps S613 to S615 in FIG. 6 described in the first exemplary embodiment. In step S1001, the additional region determination module 313 makes an inquiry to the region correspondence management module 314 to acquire the region corresponding to the region determined in step S613 or S615. Further, the acquired region is determined as the additional region. Table 8 illustrates an example of a region correspondence relationship table managed by the region correspondence management module 314 is illustrated in.

TABLE 8

| Region | Additional Region |
| --- | --- |
| Europe | Europe-2 |
| Europe-2 | Europe |
| . | . |
| . | . |
| . | . |

In the region correspondence relationship table illustrated in the table 8, it is assumed that a correspondence relationship thereof is managed in advance because the Europe region and the Europe-2 region are under the same regulation. However, a standard for determining a correspondence relationship between the regions is not limited to whether the regions are under the same regulation, and the correspondence relationship between the regions may be determined and managed based on another valid standard.

Herein, if the region determined in step S613 or S615 is the Europe region, the Europe-2 region can be acquired as the additional region. In step S1002, the region determination module 310 adds the additional region acquired in step S1001 to the access token usable region. When the new usable region added with the additional region is determined, the processing proceeds to step S621.

According to the present exemplary embodiment, even in a case where the access token is the access token of an OAuth owner in a region different from the own region, the resource server can accept the access token if the region has a correspondence relationship with the own region. Therefore, the access token can be mutually used between the regions regulated under the same regulation, so that convenience thereof is improved.

Next, a third exemplary embodiment will be described with reference to the appended drawings. Hereinafter, the description of a configuration common to the configuration described in at least any one of the first and the second exemplary embodiments will be omitted, and only differences from the first and second exemplary embodiments will be described. If the region that the terminal 111 accesses is an invalid region, the resource server can achieve the purpose by denying the access. However, there is a case where the client simply follows a specification of the GeoDNS, and does not intend to access the region different from the access token usable region. In such a case, the convenience can be improved if the access from the terminal 111 is redirected to an appropriate region.

Figure 11:
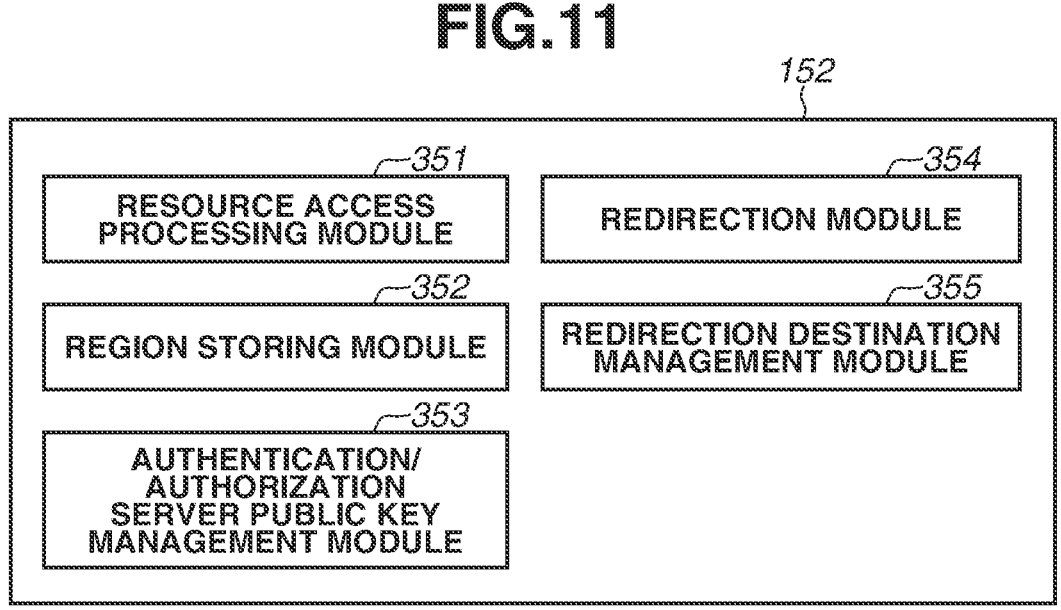
FIG. 11 is a block diagram illustrating a module configuration according to a third exemplary embodiment.

FIG. 11 is a block diagram illustrating a module configuration of the resource server 152 according to the present exemplary embodiment. In addition, a configuration of the resource server 162 may be similar to that of the resource server 152. The resource server 152 includes a redirection module 354 and a redirection destination management module 355 in addition to the modules described in the first exemplary embodiment. The redirection module 354 makes an inquiry to the redirection destination management module 355 to redirect an access which the resource access processing module 351 determines as an access to an invalid region to a resource server having the identical function and existing in the appropriate region.

Figure 12:
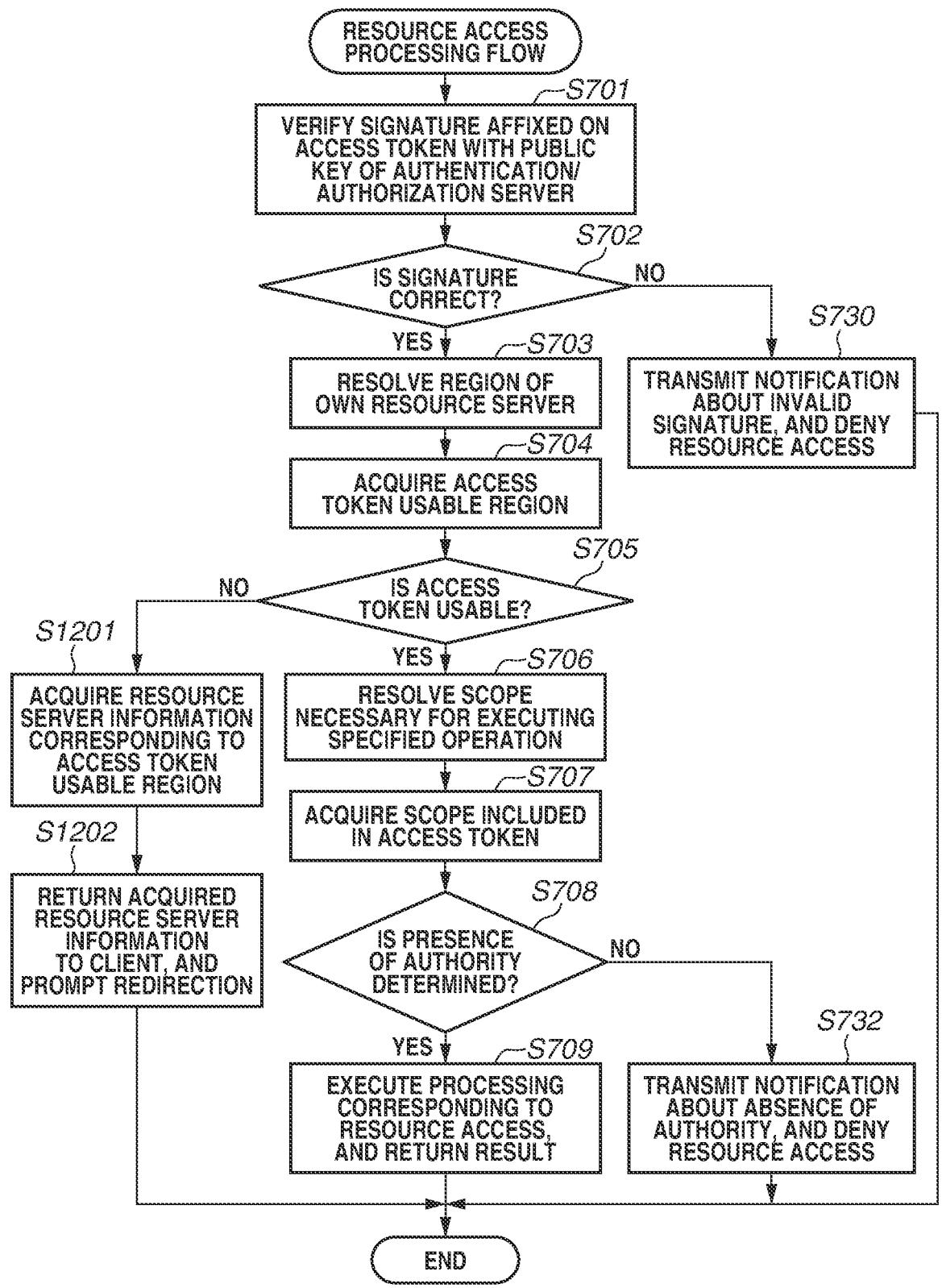
FIG. 12 is a flowchart illustrating resource access processing flow according to the third exemplary embodiment.

FIG. 12 is a flow chart illustrating resource access processing of the resource server 152 including redirection processing of an invalid region according to the present exemplary embodiment. In this processing flow, the processing proceeds to step S1201 when the region is determined to be invalid in step S705 of FIG. 7 in the first exemplary embodiment, so that the processing is continued instead of ended.

In step S1201, the redirection module 354 acquires a URL of a redirection destination from the redirection destination management module 355 based on the access token usable region acquired in step S704. Table 9 illustrates an example of a different region resource server information table managed by the redirection destination management module 355.

TABLE 9

| Region | Redirection Destination |
| --- | --- |
| Japan | http://japan.resource.example.com/ |
| Northamerica | http://northamerica.resource.examle.com/ |
| Default | http://japan.resource.example.com/ |

In the different region resource server information table, a URL of a resource server having a function similar to that of the resource server 152 and existing in a region different from the region of the resource server 152 is managed as a redirection destination. For example, if the access token usable region acquired in step S704 is the Japan region, a redirection destination thereof is "http://japan.resource.example.com/". In addition, a preset redirection destination is employed if the region included in the access token is not included in the table 9. In the table 9, a redirection destination corresponding to a region "Default" should be the redirection destination when the region included in the access token is not included in the table 9.

In addition, a method for executing redirection destination determination processing in step S1201 is not limited to the method using the different region resource server information table provided in advance, and another method such as a method using a URL of the resource server described in "aud" of the access token may be also used.

In step S1202, the redirection module 354 returns the URL of the redirection destination acquired in step S1202 to the resource request module 393, prompts redirection to the appropriate region, and ends the processing flow. The redirection module 354 redirects the client to another resource service existing in another region.

According to the present exemplary embodiment, even if a terminal tries to access an inappropriate region, the resource request module 393 can receive a notification about a URL of a resource server existing in an appropriate region. Therefore, even in a case where the user has accessed a resource server of a region where the user does not exist, the user can be redirected to a resource server in a correct region to execute the processing continuously by using the system such as the GeoDNS, so that convenience thereof is improved.

Other Exemplary Embodiments

The order in which the processing in each of the steps of the flowchart described in each of the first to the third exemplary embodiments is executed is not limited to the above, but can be changed as appropriate. For example, the order of execution of the verification of the access token and the verification of the region in FIG. 7 or 12 does not have to be in such an order as described in the exemplary embodiments. The region may be verified after verifications of the access token and the scope have been completed. In each of the exemplary embodiments, importance is given to verification of the region, and verification relating to authorization, such as the verification of the access token and the verification of the scope, is merely one of the conditions. Thus, verification relating to authorization does not have to be performed in the same manner as illustrated in the flowchart, and can be changed as appropriate.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-225129, filed Nov. 22, 2017, which is hereby incorporated by reference herein in its entirety.

What is claimed is:

1. An access control system comprising:
at least a terminal having a client;
a plurality of servers including a resource server having a resource, and an authorization server, wherein each server of the Plurality of servers includes:
one or more memories storing instructions; and
one or more processors that, upon execution of the instructions, configures the one or more processors to perform processing:
wherein the authorization server performs processing to issue a signed access token for executing verification of an access token by the resource server, and
wherein the resource server performs processing:
to determine whether the signed access token is valid by executing signature verification on the signed access token in a case where the resource server receives a resource request and the signed access token transmitted from the client;
to confirm whether a region of the resource server is included in the signed access token by comparing a region included in the signed access token and the region of the resource server; and
with respect to the resource request, in a case where the signed access token is determined to be valid and the region of the resource server is confirmed to be included in the signed access token,
wherein, in a case where an owner of the resource and the client are not identical to each other, the authorization server performs processing to issue the signed access token including a region to which a user who executes an authorization operation belongs based on permission to access the resource given by the user through the authorization operation.

2. The access control system according to claim 1, wherein, in a case where it is confirmed that the region of the resource server is not included in the signed access token, the resource server does not perform processing with respect to the resource request and returns a notification indicating that the region is invalid to the client.

3. The access control system according to claim 1, wherein, in a case where an owner of the resource and the client are identical to each other and the owner and a user are not associated with each other, the authorization server performs processing to issue the signed access token including all regions.

4. The access control system according to claim 1, wherein, in a case where an owner of the resource and the client are identical to each other and the owner and a specific user are associated with each other, the authentication server performs processing to issue the signed access token including a region to which the specific user belongs.

5. The access control system according to claim 1,
wherein the authorization server stores an additional region corresponding to a specific region, and
wherein the authentication server specifies the additional region corresponding to a region to which a user belongs, and issues the signed access token including the region to which the user belongs and the specified additional region.

6. The access control system according to claim 1, wherein the resource server performs processing to redirect the client to another resource server existing in another region usable with the signed access token based on the signed access token, in a case where it is confirmed that a region of the resource server is not included in the signed access token.

7. The access control system according to claim 1,
wherein the resource server performs processing to confirm whether a scope specified by the resource request is included in the signed access token by comparing a scope included in the signed access token and the scope specified by the resource request, and
performs processing with respect to the resource request based on a condition that it is confirmed that the scope specified by the resource request is included in the signed access token.

8. A control method executed by an access control system including at least a terminal having a client, a resource server having a resource, and an authorization server, the control method comprising:
  issuing a signed access token for executing verification of an access token by the resource server;
  determining whether the signed access token is valid by executing signature verification on the signed access token in a case where a resource request and the signed access token transmitted from the client are received;
  confirming whether a region of the resource server is included in the signed access token by comparing a region included in the signed access token and the region of the resource server; and
  executing processing with respect to the resource request in a case where it is determined that the signed access token is valid and it is confirmed that the region of the resource server is included in the signed access token,
  wherein, in a case where an owner of the resource and the client are not identical to each other, issuing the signed access token including a region to which a user who executes an authorization operation belongs based on permission to access the resource given by the user through the authorization operation.

9. A non-transitory computer-readable storage medium storing a program for executing a control method executed by a resource server in an access control system including at least a terminal having a client, the resource server having a resource, and an authorization server, the control method comprising:
  determining whether the signed access token is valid by executing signature verification on the signed access token in a case where a resource request and the signed access token transmitted from the client are received;
  confirming whether a region of the resource server is included in the signed access token by comparing a region included in the signed access token and the region of the resource server; and
  executing processing with respect to the resource request in a case where the determining determines that the signed access token is valid and it is confirmed that the region of the resource server is included in the signed access token,
  wherein, in a case where an owner of the resource and the client are not identical to each other, issuing the signed access token including a region to which a user who executes an authorization operation belongs based on permission to access the resource given by the user through the authorization operation.

* * * * *